(12) United States Patent
Stephan (10) Patent No.: US 12,468,312 B2
(45) Date of Patent: Nov. 11, 2025

(54) AIRCRAFT AND METHOD FOR FLIGHT CONTROL OF AN AIRCRAFT DURING FLIGHT

(71) Applicant: Volocopter GmbH, Bruchsal (DE)

(72) Inventor: Johannes Stephan, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 128 days.

(21) Appl. No.: 18/421,286

(22) Filed: Jan. 24, 2024

(65) Prior Publication Data

US 2024/0310850 A1 Sep. 19, 2024

(30) Foreign Application Priority Data

Mar. 14, 2023 (EP) ..................................... 23161882

(51) Int. Cl.
  *G05D 1/495* (2024.01)
  *B64C 13/18* (2006.01)
  *G05D 1/87* (2024.01)
  *G05D 109/25* (2024.01)

(52) U.S. Cl.
  CPC ............. *G05D 1/495* (2024.01); *B64C 13/18* (2013.01); *G05D 1/87* (2024.01); *G05D 2109/254* (2024.01)

(58) Field of Classification Search
  CPC .... G05D 1/495; G05D 1/87; G05D 2109/254; B64C 13/18
  See application file for complete search history.

(56) References Cited

U.S. PATENT DOCUMENTS

| | | |
|---|---|---|
| 9,168,995 B2 | 10/2015 | Brot et al. |
| 2011/0276199 A1 | 11/2011 | Brot |
| 2018/0290730 A1 | 10/2018 | Brot |

(Continued)

FOREIGN PATENT DOCUMENTS

| | | |
|---|---|---|
| CN | 101939220 B | 1/2015 |
| WO | 2021224185 A1 | 11/2021 |

OTHER PUBLICATIONS

"Lyapunov stability", retreived from https://en.wikipedia.org/wiki/Lyapunov_stability on Jan. 24, 2024, 8 pages.

(Continued)

*Primary Examiner* — Aaron L Troost
(74) *Attorney, Agent, or Firm* — FIG. 1 Patents (57) ABSTRACT

A method for flight control of an aircraft with multiple actuators during flight is disclosed. For each actuator, a control command is computed according to at least one predetermined control law and based on pilot inputs and sensor measurements in relation to a physical state of the aircraft. The respective control commands are provided to the actuators. The control commands are independently monitored by estimating or measuring a current physical state of the aircraft and comparing it with the control commands. This comparison includes checking whether the control commands stabilize the aircraft in a stable state in the absence of both disturbances and pilot inputs according to at least one predefined criterion. If the monitoring indicates a lack of stability, transmission of the control commands is prevented and a backup control command is computed for each actuator.

18 Claims, 3 Drawing Sheets

(56) References Cited

U.S. PATENT DOCUMENTS

2019/0378419 A1* 12/2019 Gansmandel ............ G08G 5/34
2021/0284327 A1*  9/2021 Zwiener ................ B64C 13/503

OTHER PUBLICATIONS 23161882.8, "European Search Report", EP Application No. 23161882.8, Jun. 30, 2023, 11 pages.
Khalil, H.K., "Nonlinear Systems", Prentice Hall; Upper Saddle River, NJ, Theorem 3.1, 1996, 748 pages.
Sha, Lui, "Using Simplicity to Control Complexity", IEEE Software, vol. 18, No. 4; XP055776948, Jul./Aug. 2001, 9 pages.

* cited by examiner

AIRCRAFT AND METHOD FOR FLIGHT CONTROL OF AN AIRCRAFT DURING FLIGHT

PRIORITY STATEMENT

This application claims priority to EP 23161882.8 filed Mar. 14, 2023, which is hereby incorporated by reference as if fully set forth.

BACKGROUND

The application relates to a method for flight control of an aircraft during flight, for example an electrically propelled aircraft with vertical take-off and landing capability. The aircraft includes a plurality of N, N∈N actuators for operating the aircraft's movable flight surfaces and/or propulsion units via pilot inputs w. The application also relates to at least one pilot input device for providing said pilot inputs.

Typically, the (direct) Lyapunov method is employed offline during an aircraft design stage to verify a given control law design and/or support a selection of control law parameters.

In order to ensure the integrity and correctness of flight control commands in an aircraft during flight (i.e., online), a COM/MON design is often used. In this design, a COM channel generates said control commands which are then analyzed by an independent MON channel, which MON channel is typically devised as a functional copy of the COM channel. Examples for this approach can be found in US 2011/0276199 A1, US 2018/0290730 A1, U.S. Pat. No. 9,168,995 B2 and CN 101939220 B.

Figure 1:
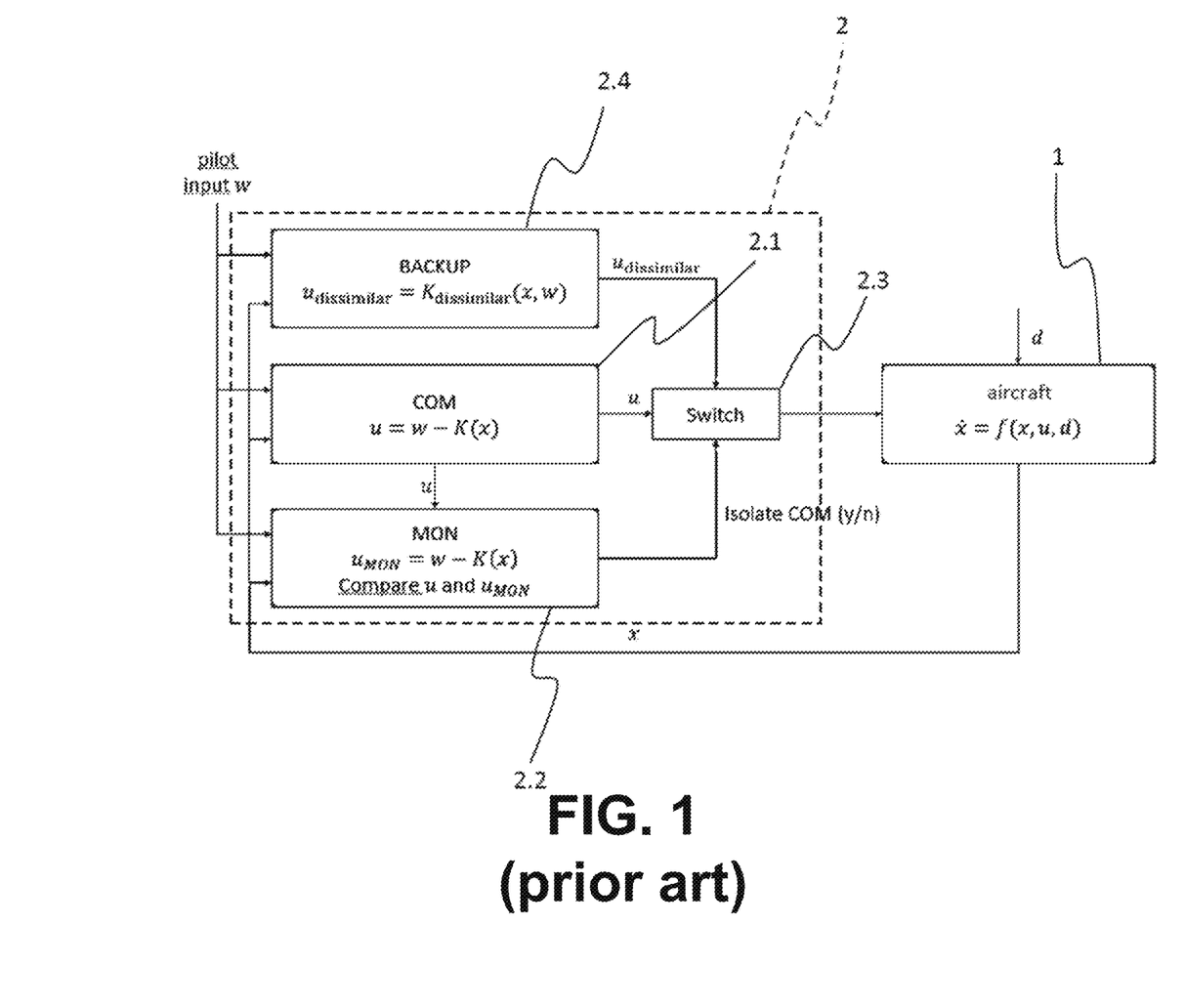
FIG. 1 shows an aircraft having a flight control system as known from the prior art for comparison.

The COM channel performs the actual control task, while the MON channel monitors the validity of the actions of the COM channel and, if necessary, passivates the COM channel via a switch located at the output of the COM channel. To ensure continued operation in this case, a dissimilar backup controller takes over, which is illustrated in FIG. 1. A typical application of this approach is for flight control in commercial aviation.

In general, the MON channel is an exact functional copy of the COM channel (see FIG. 1). Thus, if there is a random fault in execution or a systematic implementation error on either the COM channel or the MON channel, this is identified by a mismatch between an output of the COM channel and an output of the MON channel. In this context, a dissimilar software implementation and dissimilar hardware/part numbers (particularly for any processors and memory modules) need to be deployed for the COM channel and MON channel to ensure an absence of common or shared errors.

The approach described above is suitable to detect and mitigate implementation errors and random hardware faults. However, design errors on the functional or logical level (e.g., software design) are usually not noticed when the MON channel is an exact functional copy of the COM channel because a design error can affect both channels. To prevent this problem, additional design error monitors can be implemented. For example, a dissimilar logic is usually implemented to check the correctness of the system outputs for given system inputs at each point in time.

The design of flight control laws presents a particular challenge for flight control laws, where the system outputs to be checked usually depend on a large number of system inputs and the relationship between inputs and outputs is typically complex and often nonlinear. Verifying the correctness of outputs with dissimilar logic is therefore nontrivial.

A main goal of flight control laws is to stabilize the flight motion, i.e., the motion of the aircraft during flight. An intuitive idea for a design error monitor is thus to monitor the flight motion in order to detect a reduction in stability and/or controller performance. One problem with this approach resides in the fact that not only design errors/faults in the control law but also external disturbances (e.g., gusts) as well as errors/faults in other aircraft systems or components (e.g., the aircraft's actuators or sensors) can lead to reduced aircraft stability or reduced flight controller performance.

A poorly designed design error monitor might falsely detect an allegedly erroneous COM behavior, which could lead to channel isolation in case of challenging scenarios such as significant external disturbance and/or errors/faults outside the control channel. The resulting hand-over to the dissimilar backup controller in such a situation presents a significant risk as (a) the transition typically causes a transient and (b) the backup control logic is typically somewhat simpler and less performant.

To this end and due to a lack of systemic methods to derive design error monitors for control laws, the definition of design error monitors presents a significant challenge in the development of flight control laws.

SUMMARY

An objective of the present application is to provide a method and an aircraft of the above-defined type that can achieve robust detection of both design and implementation errors in the flight controls logics even in the presence of external disturbances (e.g., gusts) as well as in the presence of errors/faults in other aircraft systems or components (e.g., actuators or sensors) during flight (i.e., online).

This objective is achieved by means of a method as defined in this document and by an aircraft as defined in this document.

According to a first aspect of an embodiment, a method for flight control of an aircraft during flight, preferably an electrically propelled aircraft with vertical take-off and landing capability, which aircraft comprises a plurality of N, N∈N actuators for operating the aircraft's movable flight surfaces and/or propulsion units via pilot inputs w, includes: computing, for each actuator, a control command established according to at least one predetermined control law for control of the flight surface or the propulsion unit controlled/operated by a given actuator and based on said pilot inputs w as well as on sensor measurements in relation to a physical state x of the aircraft and providing respective control commands u, u∈$R^N$ to said actuators; independently monitoring said control commands u by estimating and/or measuring a current physical state x of the aircraft and comparing said physical state x with said control commands u, which comprises checking whether or not said control commands u stabilize the aircraft in a stable state x for time t→∞ in the absence of both disturbances d, i.e., d=0, and pilot inputs, i.e., w=0 according to at least one predefined criterion; if said monitoring indicates a lack of stability, preventing transmission of said control commands u to said actuators and independently computing, for each actuator, a backup control command established according to at least one predetermined backup control law for control of the flight surface or the propulsion unit controlled/operated by a given actuator and providing respective backup control commands to said actuators.

In other words, said control commands u, which are typically generated by a COM channel, are independently monitored, i.e., by means of an entity that is different in design from said COM channel, in particular a MON channel, by estimating and/or measuring a current physical state x of the aircraft and comparing said physical state x with said control commands u. This comparison includes checking, repeatedly during flight (i.e., online), whether or not said control commands u tend to stabilize the aircraft in a stable state x for time t, t→∞, in the absence of both disturbances d, i.e., d=0, and pilot inputs w, i.e., w=0, according to said at least one predefined criterion.

According to a second aspect of the application, an aircraft, in particular a manned aircraft, preferably an electrically propelled aircraft with vertical take-off and landing capability, which aircraft comprises a plurality of N, N∈ $\mathbb{N}$ actuators for operating the aircraft's movable flight surfaces and/or propulsion units via pilot inputs w and at least one pilot input device for providing said pilot inputs w, the aircraft further comprising: a flight control system for controlling a flight of the aircraft by means of said actuators; at least one sensor for measuring a current physical state x of the aircraft and for providing corresponding measurement data to said flight control system; said pilot input device in operative connection with the flight control system; the flight control system being devised for augmenting a pilot input w for enhanced robustness to detect design and implementation errors; the flight control system preferably having multiple independent channels including at least one or more primary control channel(s) generating control commands u, u∈$R^N$ for the N actuators, which control commands u are the result of a control law implemented on a given primary control channel, which primary control channel is configured to calculate said control commands u based on said pilot inputs w and said measurement data; wherein at least one independent monitoring channel is provided and configured to receive and to monitor an output u of said at least one or each primary control channel, wherein said monitoring channel is configured to estimate and/or determine said current physical state x of the aircraft from said measurement data and is further configured to check whether or not said received control commands u stabilize the aircraft in a stable state for time t→∞ in the absence of both disturbances d, i.e., d=0, and pilot inputs, i.e., w=0 according to at least one predefined criterion; which monitoring channel is further devised to isolate said primary control channel from the actuators, e.g., by operating a dedicated switch, based on said at least one predefined criterion; wherein preferably, if all primary control channels are isolated, a further independent backup control channel of the flight control system is devised to take over generation of control commands u, u∈$R^N$ for the N actuators.

In other words, said at least one independent monitoring channel (the MON channel) serves to receive and to monitor said output u of said at least one or each primary control channel (the COM channel). Said monitoring channel is further configured to estimate and/or determine said current physical state x of the aircraft from said measurement data (sensor data). Based on said estimated and/or measured state, the MON channel is then able to check (online, i.e., during flight) whether or not said received control commands u tend to stabilize the aircraft in a stable state for time t, t→∞, and in the absence of both disturbances d, i.e., d=0, and pilot inputs w, i.e., w=0, according to said at least one predefined criterion.

In the context of the present application, a manned aircraft is considered as a particular embodiment, which aircraft is controlled by means of a flight control system. The pilot provides the pilot input w to the flight control system, which pilot input is preferably augmented by the flight control system for enhanced robustness to detect design and implementation errors. To meet the high safety requirements in terms of integrity and availability, the flight control system preferably has multiple independent channels. One or more COM channel(s) generate(s) control commands u∈$R^N$ for the aircraft's N actuators, N∈$\mathbb{N}$, e.g., actuators for operating aerodynamic control surfaces (especially for fixed wing aircraft) and/or electric propulsion units for eVTOL (electrically propulsed aircraft with vertical take-off and landing capability). These control commands are the result of a calculation following a control law implemented on the COM channel, where u is calculated based on the pilot inputs and additional sensor measurements. The output u of each COM channel, in the case of a plurality of such channels, is monitored by an independent MON channel and isolated, if necessary (for instance if there is a discrepancy between the respective channel outputs). Typically, if all COM channels are thus passivated (isolated), an independent backup channel preferably takes over and provides the control commands.

Said control commands u are typically presented in the form of a vector with N components, i.e., one component for each actuator. In the present specification, both singular and plural forms are thus used as synonyms to designate said control commands u.

Therefore, the above-defined feature of "computing, for each actuator, a control command u, u∈$R^N$" shall be understood in such a way that said computed command vector comprises a command (or corresponding component) for each one of said plurality of actuators.

Let $$\dot{x}=f(x,u,d)$$

denote a dynamic system, e.g., an aircraft, with state x (e.g., without limitation, attitude angles, angular rates, position, and translational velocity), input u (control commands for operating at least one of aerodynamic primary control surfaces electric propulsion units and trim surfaces/tabs), and unknown disturbances d (e.g., atmospheric disturbances, system degradation such as—without limitation—actuator loss, mass distribution differing from a nominal configuration, etc.), which affect the motion of the aircraft, wherein $f(x, u, d)$ is a function of said variables and $\dot{x}$ is the derivative with respect to time.

The flight control problem, as implemented by means of an embodiment of the method, can then be stated as follows: provide a control command vector u such that the undisturbed system (i.e., d=0) converges asymptotically to a stationary equilibrium condition x, in absence of pilot inputs (i.e., w=0), i.e., t→∞: x=→$x_0$ for d=w=0, where 0=$f(x_0, u_0, 0)$ exists with $u_0$ denoting a trim control, i.e., control commands for said trim surfaces/tabs.

In the following, $x_0$=0 is assumed. If this is not the case, the system can be simply transformed by setting x'=x−$x_0$⇒$x_0$'=0.

A known approach to solve the flight control problem, which approach can also be used in an embodiment, reads $$u=w-K(x),$$

i.e., the pilot inputs w are augmented or modified by using a control law K(x). The control law K=K(x), which is generally non-linear, has the task to asymptotically stabilize the undisturbed error dynamics in the absence of pilot inputs, i.e., t→∞: x→$x_0$ for d=w=0.

The (direct) Lyapunov method can be used to discuss various types of stability for the solutions of differential equations describing dynamical systems. The most important type is that concerning the stability of solutions in the vicinity of a point of equilibrium. This problem may be addressed by means of the theory of Aleksandr Lyapunov, cf. https://en.wikipedia.org/wiki/Lyapunov_stability, hence the name, which introduces so-called (quadratic) Lyapunov functions.

Let V=$x^T$·P·x denote a quadratic Lyapunov function with P=$P^T$>0, i.e., the relation: V>0:||x||>0 holds. An undisturbed control loop is asymptotically stable in the absence of pilot inputs with respect to the equilibrium condition $x_0$ (i.e., t→∞: x→$x_0$ for d=w=0) if the following relation is true:

$$x \neq 0 : \dot{V} = 2 \cdot x^T \cdot P \cdot \dot{x} < 0.$$

A condition for exponential stability, which specifies the rate of convergence and is thus a more stringent condition than asymptotic stability (assuming ||x(t)||≤β·$e^{-\lambda t}$ for d=w=0 with decay rate λ≥0), reads $$x \neq 0: \dot{V} < -\lambda \cdot V \Rightarrow 2 \cdot x^T \cdot P \cdot \dot{x} < -\lambda \cdot x^T \cdot P \cdot x.$$

For λ=0 this equals asymptotic stability as a special case.

The concept of using a scalar function V(x) to assess the stability of a dynamic system $\dot{x}$=g(x) with respect to an equilibrium condition $x_0$ with 0=g($x_0$) is known as the above-mentioned (direct) method of Lyapunov, cf., e.g., Khalil, H. K. (1996). Nonlinear systems. Prentice Hall Upper Saddle River, NJ, Theorem 3.1.

In the context of an example implementation, a safety-critical control problem, such as flight control of a manned aircraft, is considered where the integrity of the controller output, i.e., the control commands u, must be ensured. Therefore, a COM/MON system architecture is used in which the MON channel monitors the validity of the commands u generated by the COM channel and isolates the output if necessary.

The MON channel is preferably designed as follows:

It has an independent design with respect to the COM channel. This preferably means that there are no shared logics, particularly the COM channel's control law K(x) shall not be used explicitly. This enables to not only to identify implementation errors and random hardware faults, but also design errors in the control law, which is typically the most complex algorithm or logic of the COM channel.

No explicit use of the disturbance d, since it is typically unknown.

Note that convergence of x→0 is not a suitable MON channel criterion, since an unknown non-zero perturbation (i.e., d≠0) would negate this approach.

In an example embodiment, the following solution is proposed: the MON channel uses x (i.e., said estimated and/or measured aircraft state) and u (as output from the COM channel) as input. The MON channel then checks whether or not the control command u issued by the COM channel would asymptotically stabilize the unperturbed system (d=0) if pilot inputs are not present (w=0).

For instance, this is the case if the relation $$\frac{1}{2} \cdot \dot{V} = x^T \cdot P \cdot \dot{x} = x^T \cdot P \cdot f(x, -K(x), 0) < 0 \text{ (for } \|x\| > \epsilon, \epsilon > 0)$$

holds, which follows from u=w−K(x)=−K(x) for w=0. The parameter ϵ>0 can be advantageously used as a criterion to pause the monitoring if the state x is (too) close to the equilibrium condition 0, in which case the comparison is numerically not robust. For ||x||≤ϵ the comparison is thus preferably paused.

On the other hand, this is equivalent to stating that the state vector x has converged, and thus the COM control law has fulfilled its purpose. In case a disturbance d≠0 or a pilot input w≠0 leads to an excitement such that ||x||>ϵ, the monitoring preferably resumes.

In a similar way, in another example embodiment the more stringent condition for exponential stability can be checked by the MON channel, which then uses the relation $$\frac{1}{2} \cdot \dot{V} = x^T \cdot P \cdot \dot{x} = x^T \cdot P \cdot f(x, -K(x), 0) < \frac{\lambda}{2} \cdot x^T \cdot P \cdot x \text{ (for } \|x\| > \epsilon).$$

Thus, with the proposed systematic approach according to an example implementation, integrity of the control law in the COM channel can be independently checked without knowing the disturbances d. A predefined criterion is used to check whether the control command u provided by the COM channel stabilizes the unperturbed system in the absence of pilot inputs (i.e., w=0) $\dot{x}$=f(x,−K(x),0) for the given state x. This follows from $\dot{x}$=f(x, u, d), where u=w−K(x)=−K(x), and works independently of any unknown external disturbances d.

The following embodiments have proven particularly advantageous:

In an example embodiment of the method said at least one predefined criterion is met if $$\frac{1}{2} \cdot \dot{V} = x^T \cdot P \cdot \dot{x} = x^T \cdot P \cdot f(x, -K(x), 0) < 0 \text{ (for } \|x\| > \epsilon),$$

wherein $\dot{x}$=f(x,u,d)

denotes the temporal evolution or time derivative $\dot{x}$ of a physical state x of the aircraft expressed as a mathematical function f dependent on said physical state x of the aircraft, which state is defined by one or more of attitude angles, angular rates, position, and translational velocity, f being further dependent on said control commands u, and further dependent on unknown disturbances d, which disturbances comprise one or more of atmospheric disturbances, system degradation such as actuator loss, a mass distribution differing from a nominal configuration or other disturbances that affect a motion of the aircraft; wherein V=$x^T$·P·x denotes a quadratic Lyapunov function with P=$P^T$>0, so that the relation: V>0: ||x||>0 holds and ϵ denotes a numerical parameter>0.

This ensures stable asymptotic behaviour of aircraft control, i.e., the aircraft tends to acquire a stable state, as explained above.

A corresponding embodiment of the aircraft said monitoring channel is configured to verify the relation $$\frac{1}{2} \cdot \dot{V} = x^\top \cdot P \cdot \dot{x} = x^\top \cdot P \cdot f(x, -K(x), 0) < 0 \text{ (for } \|x\| > \epsilon),$$

wherein $\dot{x} = f(x,u,d)$ denotes the temporal evolution or time derivative $\dot{x}$ of a physical state x of the aircraft expressed as a mathematical function $f$ dependent on said physical state x of the aircraft, which state is defined by one or more of attitude angles, angular rates, position, and translational velocity, $f$ being further dependent on said control commands u, and further dependent on unknown disturbances d, which disturbances comprise one or more of atmospheric disturbances, system degradation such as actuator loss, a mass distribution differing from a nominal configuration or other disturbances that affect a motion of the aircraft; wherein $V = x^T \cdot P \cdot x$ denotes a quadratic Lyapunov function with $P = P^T > 0$, so that the relation: $V > 0$: $\|x\| > 0$ holds, and $\epsilon$ denotes a numerical parameter $> 0$.

In another preferred embodiment of the method said at least one predefined criterion is met if $$\frac{1}{2} \cdot \dot{V} = x^\top \cdot P \cdot \dot{x} = x^\top \cdot P \cdot f(x, -K(x), 0) < \frac{\lambda}{2} \cdot x^\top \cdot P \cdot x \text{ (for } \|x\| > \epsilon),$$

wherein $\dot{x} = f(x,u,d)$ denotes the temporal evolution or time derivative $\dot{x}$ of a physical state x of the aircraft expressed as a mathematical function $f$ dependent on said physical state x of the aircraft, which state is defined by one or more of attitude angles, angular rates, position, and translational velocity, $f$ being further dependent on said control commands u, and further dependent on unknown disturbances d, which disturbances comprise one or more of atmospheric disturbances, system degradation such as actuator loss, a mass distribution differing from a nominal configuration or other disturbances that affect a motion of the aircraft; wherein $V = x^T \cdot P \cdot x$ denotes a quadratic Lyapunov function with $P = P^T > 0$, so that the relation: $V > 0$: $\|x\| > 0$ holds and E denotes a numerical parameter $> 0$; wherein it is assumed that $\|x(t)\| \leq \beta \cdot e^{-\lambda t}$ for $d = w = 0$ with a decay rate $\lambda \geq 0$ and $\beta = $ const.

This criterion demands exponential behaviour and is thus stricter than the criterion presented before.

In a corresponding embodiment of the aircraft said monitoring channel is configured to verify the relation $$\frac{1}{2} \cdot \dot{V} = x^\top \cdot P \cdot \dot{x} = x^\top \cdot P \cdot f(x, -K(x), 0) < \frac{\lambda}{2} \cdot x^\top \cdot P \cdot x \text{ (for } \|x\| > \epsilon),$$

wherein $\dot{x} = f(x,u,d)$ denotes the temporal evolution or time derivative $\dot{x}$ of a physical state x of the aircraft expressed as a mathematical function $f$ dependent on said physical state x of the aircraft, which state is defined by one or more of attitude angles, angular rates, position, and translational velocity, $f$ being further dependent on said control commands u, and further dependent on unknown disturbances d, which disturbances comprise one or more of atmospheric disturbances, system degradation such as actuator loss, a mass distribution differing from a nominal configuration or other disturbances that affect a motion of the aircraft; wherein $V = x^T \cdot P \cdot x$ denotes a quadratic Lyapunov function with $P = P^T > 0$, so that the relation: $V > 0$: $\|x\| > 0$ holds, and E denotes a numerical parameter $> 0$; wherein it is assumed that $\|x(t)\| \leq \beta \cdot e^{-\lambda t}$ for $d = w = 0$ with a decay rate $\lambda \geq 0$ and $\beta = $ const.

In yet another preferred embodiment of the method said parameter $\epsilon$ is used as a criterion to pause the monitoring if the state x is close to an equilibrium condition $x = 0$, i.e., for $\|x\| \geq \epsilon$.

In this region, the system can be numerically unstable, which shall be avoided. Furthermore, the state x has proven to be convergent, which is the required result.

In a corresponding embodiment of the aircraft said monitoring channel is configured to use said parameter $\epsilon$ as a criterion for to pause its monitoring if the state x is close to an equilibrium condition $x = 0$, i.e., for $\|x\| \leq \epsilon$.

In a highly preferred embodiment of the method the comparison is thus paused for $\|x\| \leq \epsilon$ and said respective control commands u, $u \in R^N$ are provided to said actuators.

In a corresponding embodiment of the aircraft said monitoring channel is therefore configured to pause the comparison for $\|x\| \leq \epsilon$ and to allow provision of said control commands u, $u \in R^N$ to said actuators.

In another highly preferred embodiment of the method the monitoring resumes in case that a disturbance $d \neq 0$ and/or pilot input $w \neq 0$ leads to an excitement of the aircraft such that $\|x\| > \epsilon$.

In this case, the systematic approach is advantageously employed to provide increased robustness to detect design and implementation errors in the flight control logic.

In a corresponding embodiment of the aircraft in case that a disturbance $d \neq 0$ and/or pilot input $w \neq 0$ leads to an excitement of the aircraft such that $\|x\| > \epsilon$, said monitoring channel is configured to resume the monitoring.

In still another highly preferred embodiment of the method said control commands are calculated based on a relation $u = w - K(x),$ according to which the pilot inputs w are augmented with a control law $K(x)$, in particular with said at least one predetermined control law, which control law K is preferably non-linear and is devised to asymptotically stabilize any undisturbed error dynamics in absence of pilot inputs, i.e., $t \to \infty$: $x \to x_0$ for $d = w = 0$, wherein $x_0$ denotes an equilibrium condition or state.

This further helps to enhance robustness to detect design and implementation errors in the flight control logics.

In a corresponding embodiment of the aircraft said primary control channel is configured to implement a relation $u = w - K(x),$ according to which the pilot inputs w are augmented with a control law $K = K(x)$, in particular with said at least one predetermined control law, which control law K is preferably non-linear and is devised to asymptotically stabilize any undisturbed error dynamics in absence of pilot inputs, i.e., $t \to \infty$: $x \to x_0$ for $d = w = 0$, wherein $x_0$ denotes an equilibrium condition or state.

BRIEF DESCRIPTION OF THE DRAWINGS

Characteristics and advantages of example embodiments are described by way of example with reference to the drawings.

DETAILED DESCRIPTION

As shown in FIG. 1, which represents the prior art, an aircraft 1, which comprises a plurality of actuators (not shown) for operating movable flight surfaces and/or propulsion units (not shown), is controlled during flight with respect to said actuators, i.e., said flight surfaces and propulsion units, by means of a flight control system 2, which flight control system 2 is actually, i.e., physically, comprised within aircraft 1.

Flight control system 2 presents a COM/MON architecture comprising a primary control or COM channel ("COM") 2.1 and an independent monitoring or MON channel ("MON") 2.2. The COM channel 2.1 performs the actual control task and provides corresponding control commands u=w−K(x) to the actuators, while the MON channel 2.2 monitors the validity of the actions of the COM channel, i.e., the validity of the control commands generated by the COM channel 2.1 and, if necessary, passivates (or isolates) the COM channel via a switch 2.3 located at the output of the COM channel 2.1, so that the COM channel cannot provide control commands to the aircraft (or actuators). This is shown in FIG. 1 by annotation ("Isolate COM (y/n)"). To ensure continued operation in this case, flight control system 2 further comprises a dissimilar backup controller ("BACKUP") 2.4 that takes over aircraft control and provides backup control commands $u_{dissimilar}$ to aircraft 1, i.e., said actuators.

All of said channels or controllers 2.1, 2.2, 2.4 are devised as programmable computing devices including the required hardware (processors, memory units, etc.) and software/firmware, as known to any skilled person, although this is not shown in any detail for reason of clarity.

As already explained, aircraft pilot provides pilot input w to all three channels 2.1, 2.2 and 2.4 through a pilot input device (not shown), which channels implement a (flight) control law K(x), wherein x denotes a physical state of aircraft 1, which state can be either directly measured (via sensors, not shown) or estimated (e.g., from sensor measurements). Typically, said control law is used by COM channel 2.1 to augment the pilot input w according to the equation:

$$u = w - K(x).$$

For the MON channel 2.2 and the backup controller 2.4 this equation reads $u_{MON}$=W−K(x) and $u_{dissimilar}$=$K_{dissimilar}$(x, w), respectively. In this way, a more generic control law structure is considered for backup. If $K_{dissimilar}$=w−K(x) is chosen, the primary control structure is retained as a special case for backup, too. The aircraft's physical state x changes with time according to the equation $$\dot{x} = f(x, u, d)$$

wherein $f$ is a mathematical function with variables x, u as previously defined and d, wherein d denotes an (external) disturbance of the aircraft or the aircraft's state, e.g., caused by a gust of wind, which disturbance is typically unknown.

There can be more than one COM channel 2.1, and backup controller 2.4 is only used if all existing COM channels have been passivated previously, as explained above.

In general, the MON channel 2.2 is an exact functional copy of the COM channel 2.1. Thus, if there is a random fault in execution or a systematic implementation error on either the COM channel 2.1 or the MON channel 2.2, this is identified by a mismatch between an output of the COM channel 2.1 (i.e., control command u) and an output of the MON channel 2.2 (i.e., control command $u_{MON}$), cf. annotation "Compare u and $u_{MON}$" in FIG. 1. In this context, a dissimilar software implementation and dissimilar hardware/part numbers (particularly for any processors and memory modules) is used for COM channel 2.1 and MON channel 2.2, respectively, to ensure an absence of common or shared errors.

Figure 2:
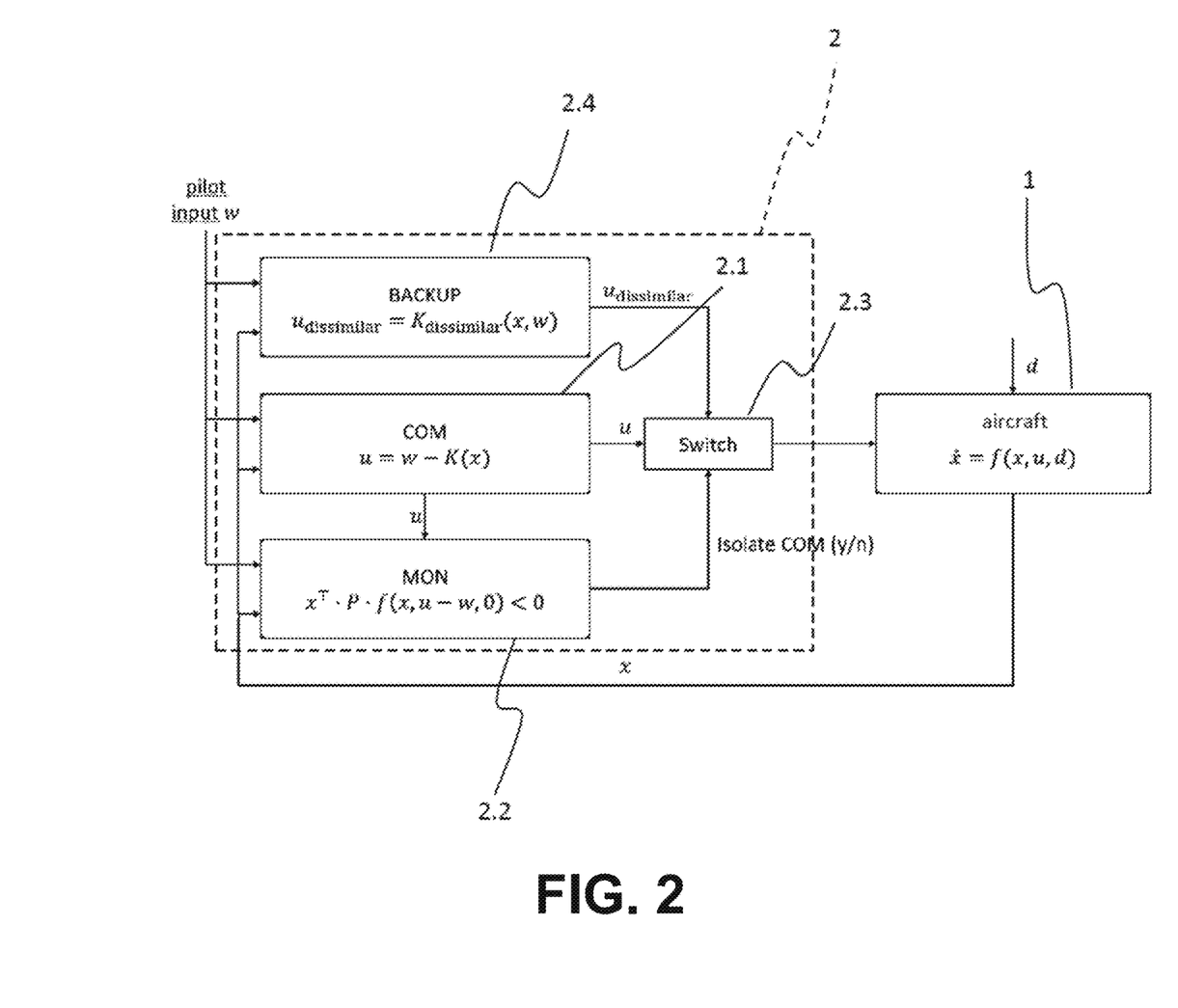
FIG. 2 shows an aircraft according to an example embodiment having an improved flight control system.

FIG. 2, in contrast, shows the solution according to an example embodiment. In the following, only the differences with respect to the prior art will be discussed. Identical reference numerals or annotations denote the same elements as in FIG. 1.

As can be gathered from FIG. 2, the MON channel 2.2 is devised differently than in the prior art:

Instead of simply comparing u (from COM channel 2.1) with alternative control commands $u_{MON}$ (from MON channel 2.2, cf. FIG. 1), MON channel 2.2 implements and continuously verifies the relation/criterion:

$$x^\top \cdot P \cdot f(x, -K(x), 0) < 0 \ (\|x\| > \epsilon),$$

based on Lyapunov's method as explained further up. Matrix P is related to a so-called quadratic Lyapunov function $V = x^T \cdot P \cdot x$ with $P = P^T > 0$, so that the relation: V>0: $\|x\| > 0$ holds, and $\epsilon$ denotes a numerical parameter>0.

If said relation is true, i.e., if said criterion is met, then the aircraft's state is assumed to be asymptotically stable (for t→0), which assumption holds even in case of non-negligible disturbance (d≠0) and/or pilot input (w≠0). In this case, control command u is applied to the aircraft 1, i.e., its actuators.

Instead of the above criterion, another relation/criterion (not shown in FIG. 2) can be used, which is stricter in terms of required stability:

$$x^\top \cdot P \cdot f(x, -K(x), 0) < \frac{\lambda}{2} \cdot x^\top \cdot P \cdot x \ (\|x\| > \epsilon),$$

wherein λ (λ>0) denotes an exponential decay rate.

If said other criterion is met, i.e., if the corresponding relation is true, then the aircraft's state is assumed to be exponentially stable (for t→∞), which assumption holds even in case of non-negligible disturbance (d≠0) and or pilot input (w≠0). In this case, too, control command u from COM channel 2.1 is applied to the aircraft 1, i.e., its actuators.

If the implemented criterion is not met, then the COM channel 2.1 is isolated/passivated via switch 2.3 and backup controller 2.4 takes over, as described before.

As before, x denotes a physical state of aircraft 1, which state can be either directly measured (via sensors, not shown) or estimated (e.g., from sensor measurements). The output of "aircraft block" 1 is x, which actually results from an integration of $\dot{x} = f(x, u, d)$, i.e., $x = \int_0^t \dot{x} \, dt$, within block 1, as known to the skilled person.

In the special case of the aircraft state x being too close to an equilibrium condition x=0, i.e., for $\|x\| \leq \epsilon$, the flight control system can be numerically unstable, which shall be avoided. Furthermore, the state x has proven to be convergent towards said equilibrium condition, which is the required result.

Therefore, in such a situation the monitoring (MON) channel 2.2 is configured to pause its monitoring based on said parameter ϵ if the aircraft state x is close to an equilibrium condition x=0, i.e., for $\|x\| \leq \epsilon$. In this case, too, control command u from COM channel 2.1 is applied to the aircraft 1, i.e., its actuators.

If $\|x\|$ becomes greater than E, e.g., in case of a disturbance, then the monitoring action of MON channel 2.2 is resumed.

Figure 3:
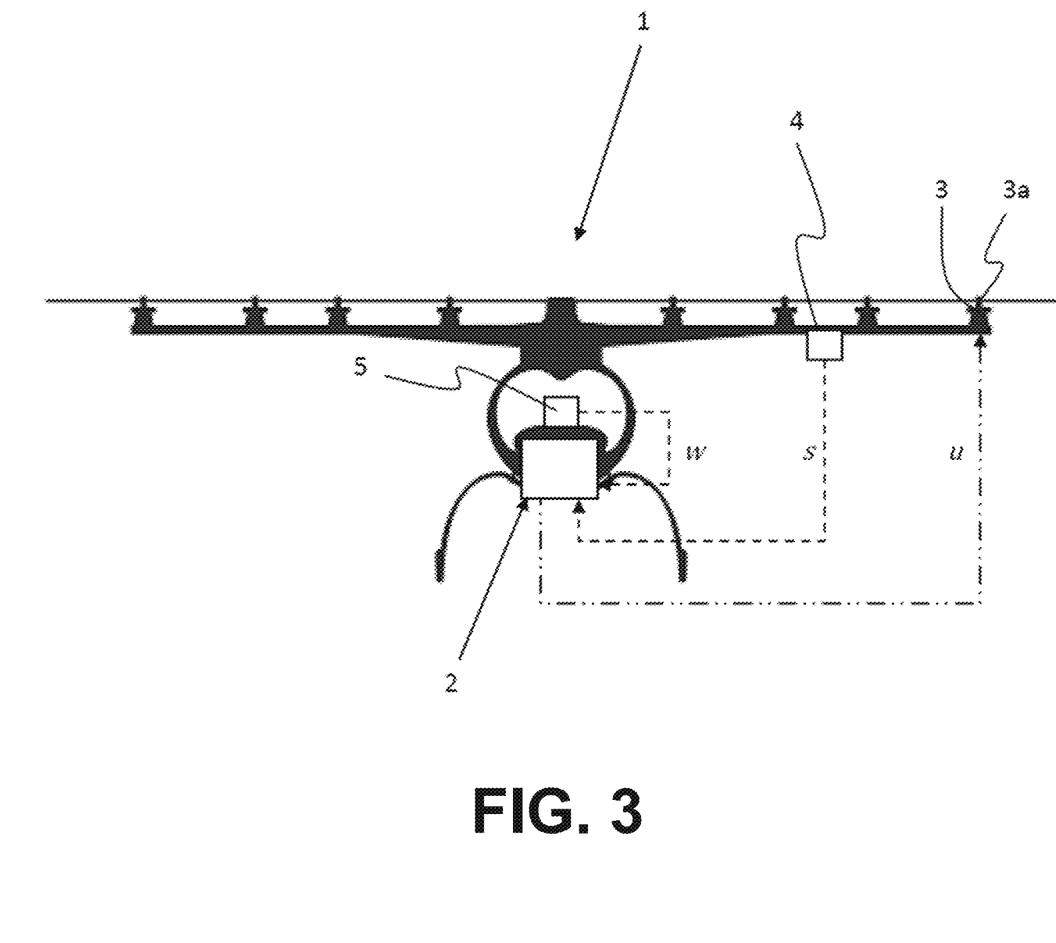
FIG. 3 shows further features of an aircraft according to an example embodiment.

FIG. 3 illustrates an aircraft 1 according to an example embodiment in some more detail.

Aircraft 1 is devised in the form of an eVTOL multicopter, i.e., an aircraft with a plurality of actuators in the form of motor controllers for operating a plurality of electrically driven propulsion units 3a, only one of which motor controllers is denoted by reference numeral 3 for reason of clarity, which aircraft 1 has vertical take-off and landing capability and can be manned. The motor controllers 3, which are operatively connected with respective rotors and electric motors comprised in said propulsion units 3a, are controlled by providing them with corresponding control commands u by means of flight control system 2, as explained earlier. In this way, a flight behaviour of the entire aircraft 1 (in terms of attitude, altitude, velocity, etc.) can be controlled.

Aircraft 1 may have further actuators (not shown), e.g., in connection with movable surfaces (flaps, wings, etc.) or a payload winch, that also influence flight behaviour of the entire aircraft 1 (in terms of attitude, altitude, velocity, etc.) and can be controlled by means of flight control system 2 and appropriate control commands u.

Aircraft 1 further has a number of sensors for providing sensor data (measurement data) in connection with said physical state of aircraft 1, only one of which is denoted by reference numeral 4. Said sensors can comprise, e.g., temperature sensors, magnetometers, gyro sensors, accelerometers, atmospheric pressure sensors, etc., without limitation. Said sensors 4 provide corresponding data to flight control system 2, which data can be used to directly measure and/or estimate a current physical state x or part of such a state of aircraft 1. Said data is therefore said to be in relation with a physical state x or part of such a state of aircraft 1 and is denoted s in FIG. 3. The actual state x of aircraft 1 is established by flight control system 2, preferably by using data s from a variety of different sensors 4.

Reference numeral 5 denotes the pilot input device that was mentioned earlier, which can take the form of a control stick, a touch screen, a pushbutton, a lever, a speech input device, etc., or any combination or number of the aforementioned elements. Said pilot input device 5 is used to provide said pilot input denoted w in FIGS. 1 through 3 to flight control system 2.

Although pilot input device 5 has been described in terms of a device that can be operated by a human pilot, the embodiments are not limited in this respect. Pilot input could also be received from a robot, an auto-pilot and/or via remote control.

Flight control system 2 is devised as explained earlier with reference to FIG. 2. It thus comprises at least one COM channel, at least one MON channel and at least one backup channel or backup controller. The MON channel is preferably devised to apply a Lyapunov method online, i.e., during flight of aircraft 1, in order to monitor functioning of said COM channel in terms of (aircraft) stability and integrity.

Although embodiments have been described with reference to an aircraft and its behavior during flight as an exemplary embodiment, the skilled person will appreciate that the concept underlying the example embodiments can be easily extended to any system or plant the overall behavior of which is governed or controlled by a plurality of actuators, which actuators are themselves controlled by means of a control system that comprises at least one primary control channel and at least one monitoring channel, which monitoring channel is devised to monitor/verify operation of said primary control channel in accordance with the described techniques and systems.

What is claimed is:

1. A method for flight control of an aircraft during flight, the aircraft including a plurality of N,N∈N actuators for operating movable flight surfaces or propulsion units of the aircraft via pilot inputs (w), the method comprising:
    computing, for each actuator, a control command (u,u∈RN) established according to at least one predetermined control law (K) for control of a movable flight surface or a propulsion unit operated by a respective actuator and based on the pilot inputs (w) and sensor measurements in relation to a physical state (x) of the aircraft and providing respective control commands (u) to the actuators;
    independently monitoring the control commands (u) by estimating or measuring a current physical state (x) of the aircraft and comparing the current physical state (x) to the control commands (u), the comparing including checking whether the control commands (u) stabilize the aircraft in a stable state x for time t→∞ in an absence of both disturbances (d) and pilot inputs (w) according to at least one predefined criterion; and
    in response to the monitoring indicating a lack of stability, preventing transmission of the control commands (u) to the actuators and independently computing, for each actuator, a backup control command (udissimilar) established according to at least one predetermined backup control law (Kdissimilar) for control of the flight surface or the propulsion unit operated by a given actuator and providing respective backup control commands (udissimilar) to the actuators,
    wherein the control commands (u) are calculated based on a relation: u=w−K(x), according to which the pilot inputs (w) are augmented with a control law (K(x)), the control law (K(x)) being non-linear and devised to asymptotically stabilize undisturbed error dynamics in absence of pilot inputs: t→∞:x→x0 for d=w=0, wherein x0 denotes an equilibrium condition.

2. The method of claim 1, wherein:
    the at least one predefined criterion is met if:

$$12 \cdot \dot{V} = x^\top \cdot P \cdot \dot{x} = x^\top \cdot P \cdot f(x, -K(x), 0) < 0 \text{ (for } \|x\| > \epsilon );$$

x'=f(x, u,d) denotes a temporal evolution or time derivative (x') of the physical state (x) of the aircraft expressed as a mathematical function (f) dependent on the physical state (x) of the aircraft, the state (x) being defined by one or more of attitude angles, angular rates, position, or translational velocity, the mathematical function (f) being further dependent on the control commands (u) and further dependent on unknown disturbances (d), the disturbances including one or more of atmospheric disturbances, a system degradation, a mass distribution differing from a nominal configuration, or other disturbances that affect a motion of the aircraft; and V=xT·P·x denotes a quadratic Lyapunov function with P=PT>0, so that the relation: V>0:x>0 holds and e denotes a numerical parameter >0.

3. The method of claim 2, wherein the parameter e is used as a criterion to pause the monitoring if the physical state (x) is close to an equilibrium condition x=0, i.e., for x≤ε.

4. The method of claim 2, wherein for x≤ε comparison is paused and the respective control commands (u,u∈ RN) are provided to the actuators.

5. The method of claim 4, wherein the method further comprises, in response to a disturbance (d≠0) or pilot input (w=0), causing an excitement of the aircraft such that x>ε and the monitoring resumes.

6. The method of claim 1, wherein:
the at least one predefined criterion is met if:

$$12 \cdot \dot{V} = x^\top \cdot P \cdot \dot{x} = x^\top \cdot P \cdot f(x, -K(x), 0) < \frac{\lambda}{2} \cdot x^\top \cdot P \cdot x \text{ (for } \|x\| > \epsilon);$$

x'=f(x, u,d) denotes a temporal evolution or time derivative (x') of the physical state (x) of the aircraft expressed as a mathematical function (f) dependent on the physical state (x) of the aircraft, the state (x) being defined by one or more of attitude angles, angular rates, position, or translational velocity, the mathematical function (f) being further dependent on the control commands (u) and unknown disturbances (d), the disturbances comprising one or more of atmospheric disturbances, a system degradation, a mass distribution differing from a nominal configuration, or other disturbances that affect a motion of the aircraft;

V=xT·P·x denotes a quadratic Lyapunov function with P=PT>0, so that the relation: V>0:x>0 holds and e denotes a numerical parameter >0; and xt≤β·e−λt for d=w=0 has a decay rate λ≥0 and β=const.

7. An aircraft comprising:
a plurality of N,N∈ N actuators for operating movable flight surfaces or propulsion units of the aircraft via pilot inputs (w) and at least one pilot input device for providing the pilot inputs (w);
a flight control system configured to control a flight of the aircraft using the actuators, the flight control system being in operative connection with the at least one pilot input device; and
at least one sensor configured to measure a current physical state (x) of the aircraft and provide corresponding measurement data(s) to the flight control system, wherein:
the flight control system is further configured for augmenting a pilot input w for enhanced robustness to detect design and implementation errors, the flight control system having multiple independent channels including at least one primary control channel that generates control commands (u,u∈ RN) for the actuators, the control commands (u) being a result of a control law (K=K(x)) implemented on a respective primary control channel that is configured to calculate the control commands (u) based on the pilot inputs (w) and the measurement data(s);
at least one independent monitoring channel is provided and configured to receive and to monitor an output (u) of the at least one primary control channel,
the monitoring channel being configured to estimate or determine the current physical state (x) of the aircraft from the measurement data(s) and is further configured to check whether the received control commands (u) stabilize the aircraft in a stable state for time t→∞ in an absence of both disturbances (d) and pilot inputs (w) according to at least one predefined criterion;
the monitoring channel is further configured to isolate the at least one primary control channel from the actuators based on the at least one predefined criterion; and
the at least one primary control channel is further configured to implement a relation: u=w−K(x), according to which the pilot inputs (w) are augmented with a control law (K(x)) that is non-linear and devised to asymptotically stabilize any undisturbed error dynamics in absence of pilot inputs (t→□:x→x0 for d=w=0, when x0 denotes an equilibrium condition or state).

8. The aircraft of claim 7, wherein:
the monitoring channel is further configured to verify a relation:

$$12 \cdot \dot{V} = x^\top \cdot P \cdot \dot{x} = x^\top \cdot P \cdot f(x, -K(x), 0) < 0 \text{ (for } \|x\| > \epsilon);$$

x=f(x, u,d) denotes a temporal evolution or time derivative (x') of the physical state (x) of the aircraft expressed as a mathematical function (f) dependent on the physical state (x), the physical state being defined by one or more of attitude angles, angular rates, position, or translational velocity, the mathematical function (f) being further dependent on the control commands (u) and unknown disturbances (d) that include one or more of atmospheric disturbances, a system degradation, a mass distribution differing from a nominal configuration, or other disturbances that affect a motion of the aircraft; and V=xT·P·x denotes a quadratic Lyapunov function with P=PT>0, so that the relation V>0:x>0 holds, and ε denotes a numerical parameter >0.

9. The aircraft of claim 8, wherein the monitoring channel is further configured to use the parameter ε as a criterion to pause its monitoring in response to the physical state (x) being close to an equilibrium condition x=0, i.e., for x≤ε.

10. The aircraft of claim 8, wherein the monitoring channel is further configured to pause comparison for x≤ε and to allow provision of the control commands (u,u∈ RN) to the actuators.

11. The aircraft of claim 10, wherein in response to a disturbance (d≠0) or a pilot input (w≠0) leading to an excitement of the aircraft such that x>ε, and the monitoring channel being further configured to resume the monitoring.

12. The aircraft of claim 7, wherein:
the monitoring channel is configured to verify a relation:

$$12 \cdot \dot{V} = x^\top \cdot P \cdot \dot{x} = x^\top \cdot P \cdot f(x, -K(x), 0) < \frac{\lambda}{2} \cdot x^\top \cdot P \cdot x \text{ (for } \|x\| > \epsilon);$$

x'=f(x, u,d) denotes a temporal evolution or time derivative (x') of a physical state (x) of the aircraft expressed as a mathematical function (f) dependent on the physical state (x), the physical state being defined by one or more of attitude angles, angular rates, position, or translational velocity, the mathematical function (f) being further dependent on the control commands (u) and unknown disturbances that include one or more of atmospheric disturbances, system degradation, a mass distribution differing from a nominal configuration, or other disturbances that affect a motion of the aircraft;

V=xT·P·x denotes a quadratic Lyapunov function with P=PT>0, so that the relation: V>0:x>0 holds, and $\epsilon$ denotes a numerical parameter >0; and xt≤β·e−λt for d=w=0 has a decay rate λ≥0 and β=const.

13. A non-transitory memory unit comprising instructions, that when executed, cause a processor of an aircraft during flight, the aircraft including a plurality of N,N∈N actuators for operating movable flight surfaces or propulsion units of the aircraft via pilot inputs (w), to:
compute, for each actuator, a control command (u,u∈ RN) established according to at least one predetermined control law (K) for control of the movable flight surface or the propulsion unit operated by a respective actuator and based on the pilot inputs (w) and sensor measurements in relation to a physical state (x) of the aircraft and provide respective control commands (u) to the actuators;
independently monitor the control commands (u) by estimating or measuring a current physical state (x) of the aircraft and comparing the current physical state (x) to the control commands (u), the comparing including checking whether the control commands (u) stabilize the aircraft in a stable state x for time t→∞ in an absence of both disturbances (d) and pilot inputs (w) according to at least one predefined criterion; and
in response to the monitoring indicating a lack of stability, prevent transmission of the control commands (u) to the actuators and independently compute, for each actuator, a backup control command (udissimilar) established according to at least one predetermined backup control law (Kdissimilar) for control of the flight surface or the propulsion unit operated by a given actuator and providing respective backup control commands (udissimilar) to the actuators,
wherein the control commands (u) are calculated based on a relation: u=w−K(x), according to which the pilot inputs (w) are augmented with a control law (K(x)), the control law (K(x)) being non-linear and devised to asymptotically stabilize undisturbed error dynamics in absence of pilot inputs: t→∞:x→x0 for d=w=0, wherein x0 denotes an equilibrium condition.

14. The non-transitory memory unit of claim 13, wherein: the at least one predefined criterion is met if:

$$12 \cdot \dot{V} = x^T \cdot P \cdot \dot{x} = x^T \cdot P \cdot f(x, -K(x), 0) < 0 \text{ (for } \|x\| > \epsilon);$$

x'=f(x, u,d) denotes a temporal evolution or time derivative (x') of the physical state (x) of the aircraft expressed as a mathematical function (f) dependent on the physical state (x) of the aircraft, the state (x) being defined by one or more of attitude angles, angular rates, position, or translational velocity, the mathematical function (f) being further dependent on the control commands (u) and further dependent on unknown disturbances (d), the disturbances including one or more of atmospheric disturbances, a system degradation, a mass distribution differing from a nominal configuration, or other disturbances that affect a motion of the aircraft; and V=xT·P·x denotes a quadratic Lyapunov function with P=PT>0 such that the relation V>0:x>0 holds and $\epsilon$ denotes a numerical parameter >0.

15. The non-transitory memory unit of claim 14, wherein the parameter e is used as a criterion to pause the monitoring if the physical state (x) is close to an equilibrium condition x=0, i.e., for x≤$\epsilon$.

16. The non-transitory memory unit of claim 14, wherein for x≤$\epsilon$ comparison is paused and the respective control commands (u,u∈RN) are provided to the actuators.

17. The non-transitory memory unit of claim 16, wherein the memory unit comprises further instructions, that when executed, cause the processor to:
cause an excitement of the aircraft such that x>$\epsilon$ and the monitoring resumes, in response to a disturbance (d≠0) or pilot input (w≠0).

18. The non-transitory memory unit of claim 13, wherein: the at least one predefined criterion is met if:

$$12 \cdot \dot{V} = x^T \cdot P \cdot \dot{x} = x^T \cdot P \cdot f(x, -K(x), 0) < \frac{\lambda}{2} \cdot x^T \cdot P \cdot x \text{ (for } \|x\| > \epsilon);$$

x'=f(x, u,d) denotes a temporal evolution or time derivative (x') of the physical state (x) of the aircraft expressed as a mathematical function (f) dependent on the physical state (x) of the aircraft, the state (x) being defined by one or more of attitude angles, angular rates, position, or translational velocity, the mathematical function (f) being further dependent on the control commands (u) and unknown disturbances (d), the disturbances comprising one or more of atmospheric disturbances, a system degradation, a mass distribution differing from a nominal configuration, or other disturbances that affect a motion of the aircraft;

V=xT·P·x denotes a quadratic Lyapunov function with P=PT>0 such that the relation: V>0:x>0 holds and e denotes a numerical parameter >0; and xt≤β·e−λt for d=w=0 with has a decay rate λ≥0 and β=const.

* * * * *